(12) United States Patent
Yang et al.

(10) Patent No.: US 7,249,770 B2
(45) Date of Patent: Jul. 31, 2007

(54) LOCKING DRILL CHUCK

(75) Inventors: Guimo Yang, Shandong Province (CN); Mingquan Cai, Shandong Province (CN)

(73) Assignee: Shandong Weida Machinery Co., Ltd., Wendeng (CN)

( * ) Notice: Subject to any disclaimer, the term of this patent is extended or adjusted under 35 U.S.C. 154(b) by 263 days.

(21) Appl. No.: 10/892,976

(22) Filed: Jul. 16, 2004

(65) Prior Publication Data

US 2005/0023776 A1 Feb. 3, 2005

(30) Foreign Application Priority Data

Jul. 17, 2003 (CN) ................................ 03 2 69091

(51) Int. Cl.
  *B23B 31/10* (2006.01)
(52) U.S. Cl. ......................................... 279/62; 279/140
(58) Field of Classification Search .................. 279/62, 279/140, 60, 61, 902
  See application file for complete search history.

(56) References Cited

U.S. PATENT DOCUMENTS

| | | | | |
|---|---|---|---|---|
| 5,765,839 A | * | 6/1998 | Rohm | 279/62 |
| 5,829,761 A | * | 11/1998 | Rohm | 279/62 |
| 6,247,705 B1 | * | 6/2001 | Yang et al. | 279/62 |
| 6,390,481 B1 | * | 5/2002 | Nakamuro | 279/62 |
| 6,848,691 B2 | * | 2/2005 | Yang et al. | 279/62 |
| 7,000,926 B1 | * | 2/2006 | Wenhua | 279/62 |
| 2003/0026670 A1 | * | 2/2003 | Temple-Wilson | 408/240 |
| 2004/0217558 A1 | * | 11/2004 | Yang et al. | 279/62 |
| 2005/0087937 A1 | * | 4/2005 | Zhou | 279/62 |
| 2005/0258605 A1 | * | 11/2005 | Tan | 279/62 |
| 2006/0027979 A1 | * | 2/2006 | Yang et al. | 279/62 |

FOREIGN PATENT DOCUMENTS

EP 1498201 A1 * 1/2005
GB 2361201 A * 10/2001

* cited by examiner

*Primary Examiner*—Monica Carter
*Assistant Examiner*—Michael W. Talbot
(74) *Attorney, Agent, or Firm*—Kenyon & Kenyon LLP

(57) ABSTRACT

A chuck for use with a manual or powered driver having a chuck body, jaws, a nut, a front sleeve, a rear sleeve, and a nut jacket is provided, wherein the jaws are respectively and operatively inserted into a plurality of angled bores uniformly distributed around the chuck body, the threads of the nut engages with that of the jaws to form a thread driving mechanism, the nut jacket is fixed onto the nut, a toothed member is fixed to the front portion of the chuck body, a plurality of elastic elements are formed at the front end of the nut jacket, a plurality of grooves are formed on the inner circumference wall of the front sleeve, wherein the positioning state of the elastic elements of the nut jacket can be controlled through the grooves of the front sleeve, and locking detents of the nut jacket and ratchets of the toothed member engage to form a locking mechanism, therefore the loosening of the drill tools due to the vibration or impact while using can be prevented.

4 Claims, 4 Drawing Sheets

LOCKING DRILL CHUCK

This application claims the benefit of the Chinese patent application No. 03269091.6 filed on Jul. 17, 2003, which is hereby incorporated by reference.

TECHNICAL FIELD

The present invention relates generally to drill chuck for use with manual drill tools or with electric or pneumatic powered drivers. More particularly, it relates to a locking drill chuck.

BACKGROUND ART

A conventional drill chuck typically comprises a chuck body, a plurality of jaws, a nut, and sleeves including a front sleeve and a rear sleeve. In the case of manual drill chucks additional bearing and bearing spacer are provided to reduce frictions.

In the structure of the conventional drill chuck, the rear sleeve and the bearing spacer are fixed onto the chuck body respectively. The jaws, usually three, are respectively inserted into three angled bores uniformly distributed around the chuck body of the drill chuck. The nut is fitted in a nut groove of the chuck body. The threads of the nut and the threads of the jaws together form a thread driving mechanism to drive the jaws into gripping relationship or loosening relationship.

In addition, a nut jacket may be disposed at the outside of the nut and fixedly connected to the nut. The front sleeve is mounted around the nut jacket and connected to the nut jacket through keys formed on the inner circumference wall of the front sleeve, key slots corresponding to the keys of the front sleeve are formed on the nut jacket. A block cover fixed to the front portion of the chuck body is provided to prevent the front sleeve from undesirable moving.

When the front sleeve is turned by hand, the front sleeve carries the nut jacket to turn accordingly, therefore the nut turns along with the nut jacket, which causes the jaws to move inwards or outwards along the angled bores in the chuck body due to the threads thereon, so the three jaws become fastened or released, therefore the handle of the drill tool is fastened by the jaws or released therefrom.

However, the conventional drill chuck with the above-described structures has a tendency to become loosening due to vibration or impact while using, which results in low reliability and bad security of the drill chuck.

SUMMARY OF THE INVENTION

Accordingly, an objective of the present invention is to provide a locking drill chuck with a simple and compact structures, high working reliability and convenience of operation, which overcomes the drawbacks of the foregoing conventional drill chucks.

To achieve the above-mentioned objective of the present invention, the present invention provides a locking drill chuck, which comprises a chuck body, a plurality of jaws (usually three), a nut, a nut jacket, a front sleeve, and a rear sleeve. A axial aperture is formed at the back end portion of the chuck body, which can be engaged with a driving shaft of a driving means, the rear sleeve is fixed onto the outer circumference of the chuck body, the three jaws are respectively and operatively inserted into three angled bores respectively defined in and equally distributed around the chuck body, the nut is threadingly engaged with the threads of the jaws inserted in the angled bores of the chuck body, the nut jacket is fixedly connected onto the nut.

The locking drill chuck according to the present invention is characterized in that a toothed member fixed onto the front portion of the chuck body is provided, a plurality of elastic elements having a elastic positioning pawl, a elastic locking positioning pawl, and a locking detent are formed at the front end portion of the nut jacket, there are grooves formed in the inner circumference wall of the front sleeve, the positioning state of the elastic elements of the nut jacket can be controlled through the grooves of the front sleeve. The locking detents engage with ratchets of the toothed member to form a locking mechanism.

Due to the above-mentioned structure of the locking drill chuck according to the present invention, the locking detents of the nut jacket directly engage with the ratchets of the toothed member on the front portion of the chuck body, therefore a unique stable locking function can be achieved.

When the handle of a drill tool is tightened by the locking drill chuck according to the present invention, turning the front sleeve to rotate with respect to the nut jacket, the elastic elements of the nut jacket will be depressed or released by engaging with or disengaging from the grooves of the front sleeve, and the elastic elements together with the ratchets on the toothed member forms a locking mechanism to achieve the locking function.

The locking drill chuck according to the present invention has a simple and compact structure, high working reliability and convenience of operation, it can be used for mounting and clamping all kinds of drill tools.

It is to be understood that both the foregoing general description and the following detailed description are exemplary and explanatory and are intended to provide further explanation of the invention as claimed.

BRIEF DESCRIPTION OF THE DRAWINGS

The above and other objects and features of the present invention will become apparent from the following description of preferred embodiments, given in conjunction with the accompanying drawing, in which.

Figure 1:
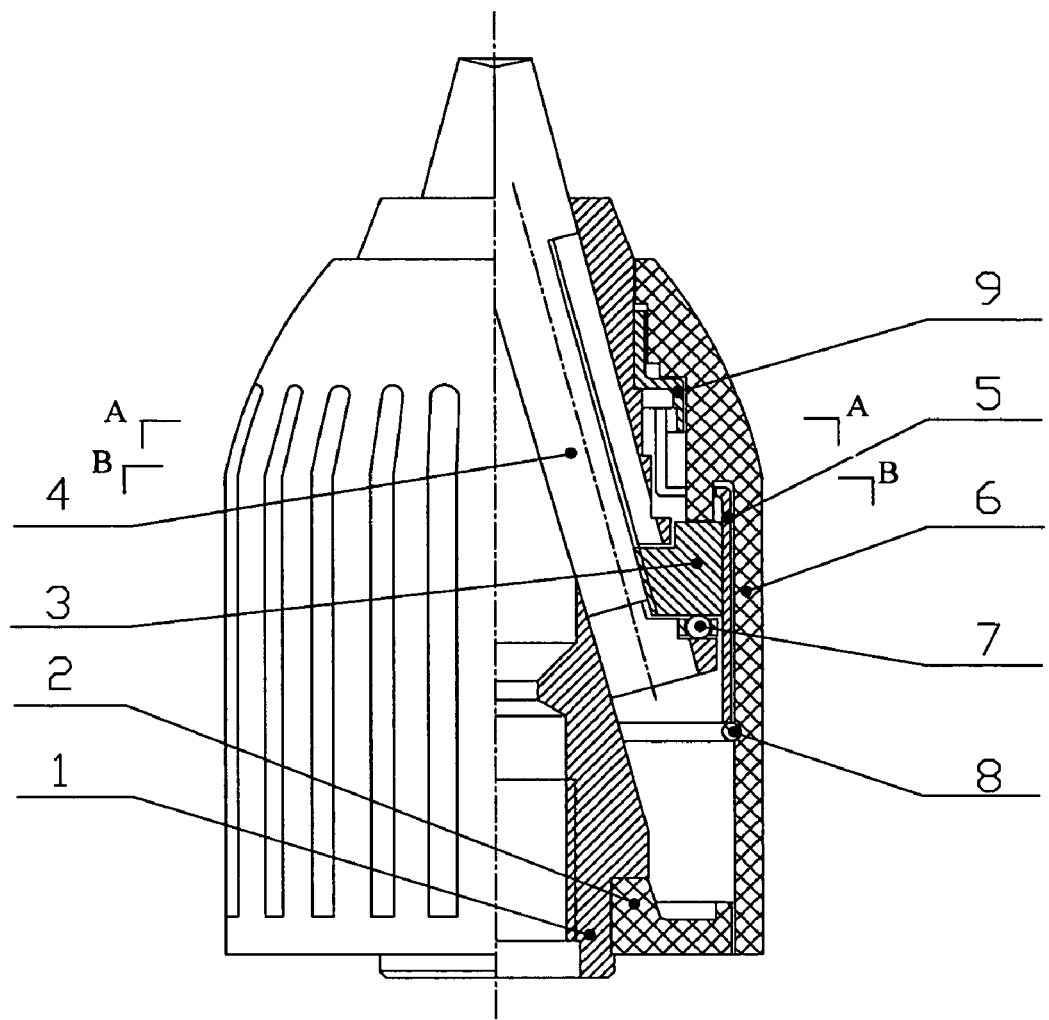
FIG. 1 is a schematic view of the structure of a locking drill chuck according to one embodiment of the present invention.

Description of reference numerals of the parts as shown in the drawings:

1. chuck body
2. rear sleeve
3. nut
4. jaw
5. nut jacket
5-1. elastic positioning pawl
5-2. locking detent
5-3. elastic locking positioning pawl
5-4. key slot 6. front sleeve
6-1. first positioning groove
6-2. second positioning groove
6-3. third positioning groove
7. bearing
8. retaining spring
9. toothed member

DESCRIPTION OF PREFERRED EMBODIMENTS

Referring now to FIG. 1, there is illustrated a locking drill chuck in accordance with the present invention. The locking drill chuck includes a chuck body 1, a rear sleeve 2, a nut 3, a plurality of jaws (there are three jaws in this embodiment) 4, a nut jacket 5, a front sleeve 6, a bearing 7, and a retaining spring 8. The three jaws 4 are respectively and operatively inserted into three angled bores respectively defined in and equally distributed around the chuck body 1, the nut 3 is fitted in a nut groove of the chuck body 1, the threads of the nut 3 and the threads of the jaws 4 together form a thread driving mechanism to drive the jaws 4 move inwards or outwards along the angled bores in the chuck body 1. The nut jacket 5 is fixed to the nut 3, that is, they are fitted in the manner of interference fit to be incorporated with each other. The rear sleeve 2 is fixedly connected to the chuck body 1 to be incorporated with each other. All of the above-described structures are well known, so their detailed description are omitted.

Figure 2:
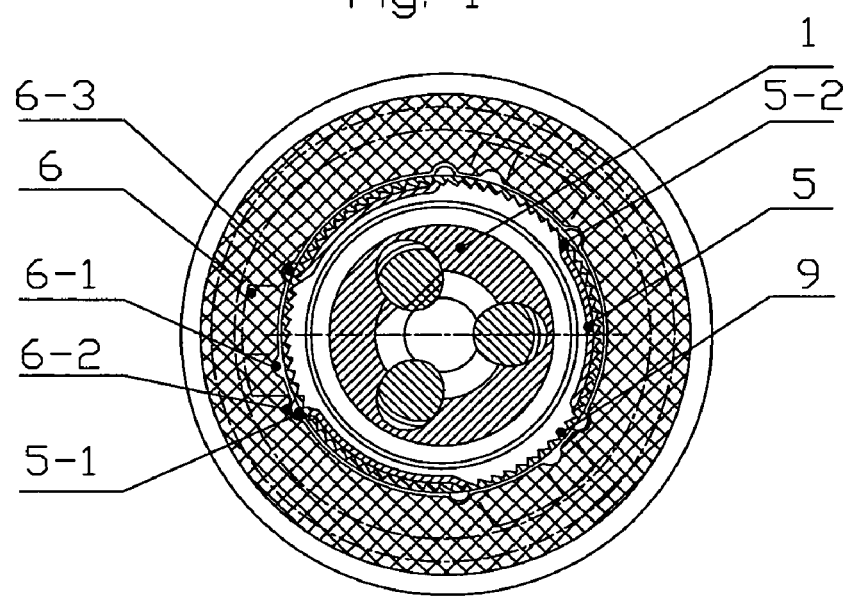
FIG. 2 is a transverse cross-sectional view taken along line A—A of FIG. 1.
Figure 6:
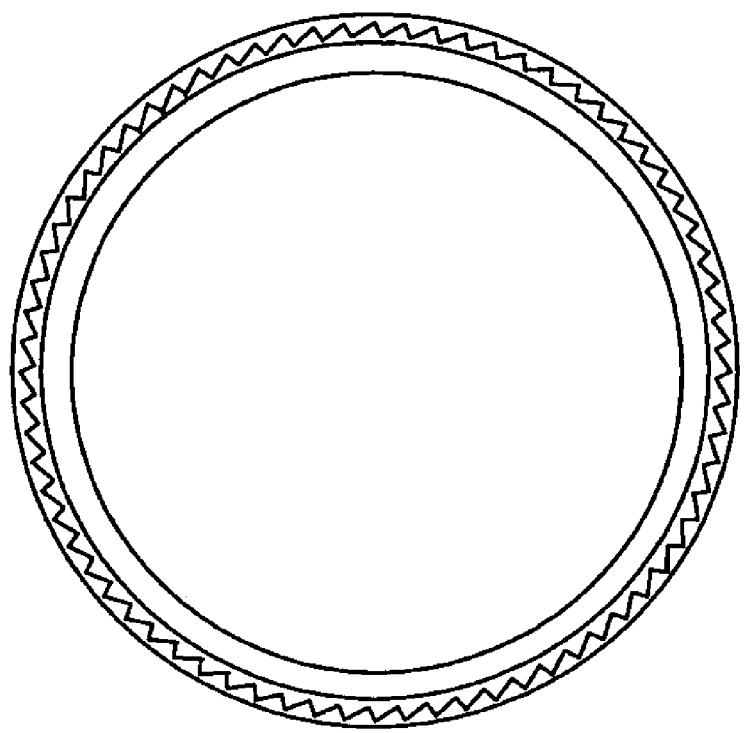
FIG. 6 is a bottom view of the toothed member of the locking drill chuck according to the present invention.
Figure 7:
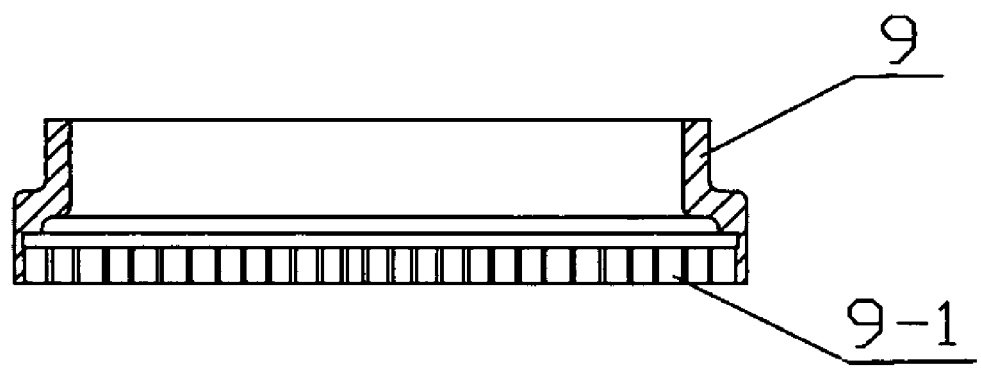
FIG. 7 is a cross-sectional view of the toothed member of the locking drill chuck according to the present invention.

As shown in FIG. 2, there is a toothed member 9 formed between the front sleeve 6 and the nut jacket 5, the toothed member 9 has a cylinder shape and connected into the front portion of the chuck body 1 in the manner of interference fit. There are ratchets formed on the toothed member 9, more particularly, a plurality of angled teeth are formed in the inner circumference wall of the lower portion of the toothed member 9 as shown in FIGS. 6 and 7, which can engage with detents of elastic elements (which will be described hereinafter). A plurality of grooves are provided in the inner circumference wall of the front sleeve 6, the grooves include first positioning grooves 6-1, i.e. the positioning grooves for a loosened state of the front sleeve 6, second positioning grooves 6-2, i.e. the positioning grooves for a fastened state of the front sleeve 6, and third positioning groove 6-3, i.e. the positioning grooves for locking of the front sleeve 6.

Figure 3:
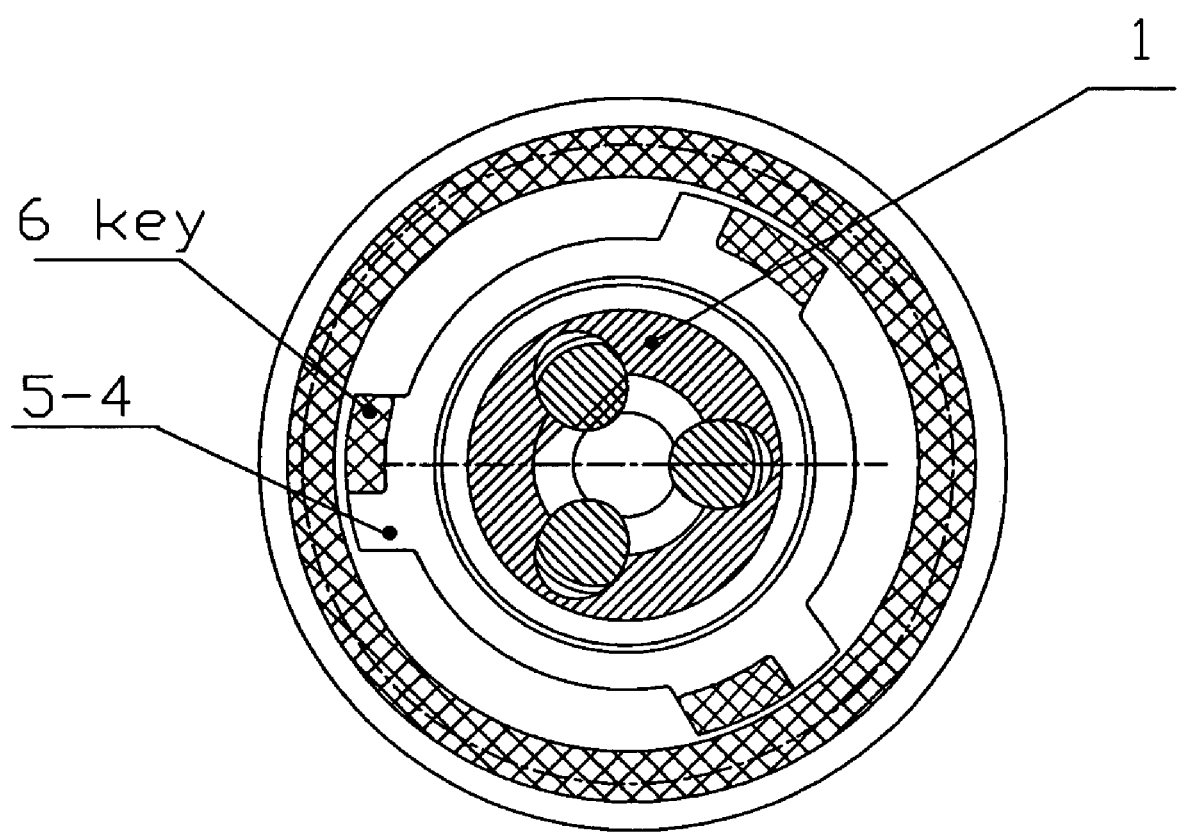
FIG. 3 is a transverse cross-sectional view taken along line B—B of FIG. 1.
Figure 4:
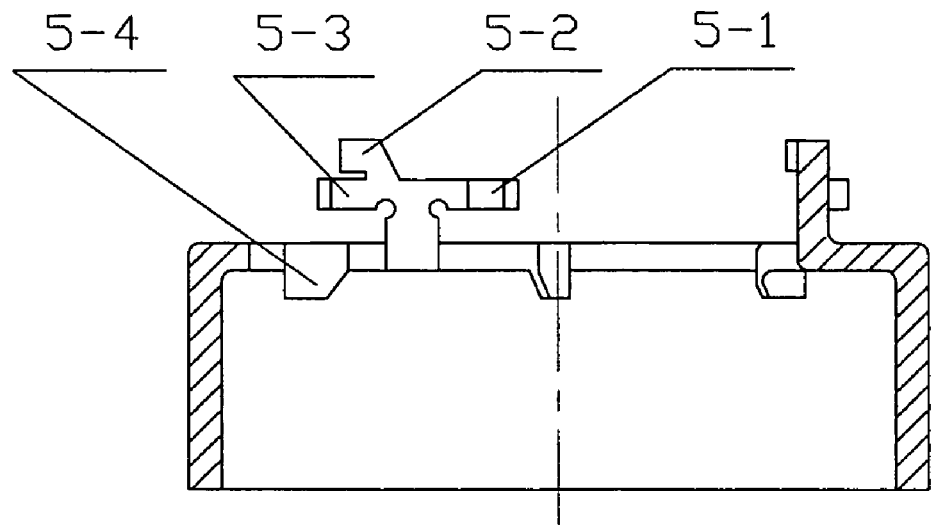
FIG. 4 is a cross-sectional view of the nut jacket of the locking drill chuck according to the present invention.
Figure 5:
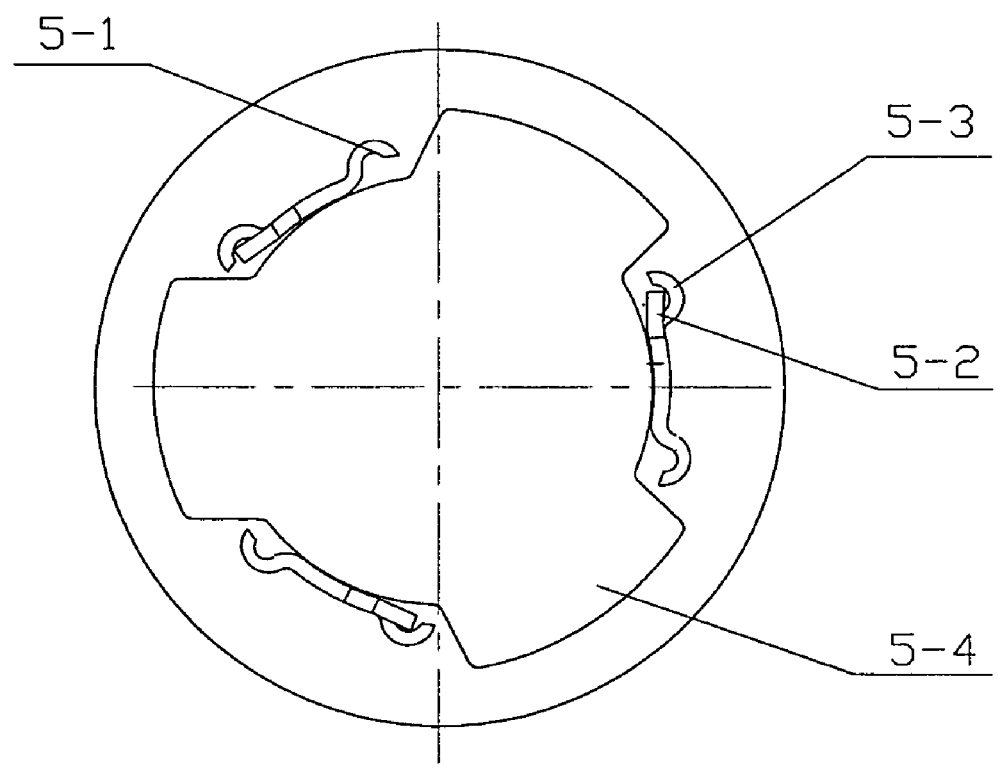
FIG. 5 is a plan view of the nut jacket of the locking drill chuck according to the present invention.

Now referring to FIGS. 4 and 5, a plurality of elastic members are formed on the front end portion of the nut jacket 5, which is integral with the nut jacket 5. Each of the elastic members has elastic positioning pawl 5-1, locking detent 5-2, and elastic locking positioning pawl 5-3. On the upper end portion of the nut jacket 5, there are key slots 5-4 formed in the radial direction, which are engaged with the keys of the front sleeve 6 respectively to transmit the torque to the nut jacket 5 and the nut 3, as shown in FIG. 3. According to the present invention, the front sleeve 6 and the nut jacket 5 can rotate with respect to each other within a predetermined angle. The nut jacket 5 of the locking drill chuck according to the present invention effects as two functions, one is to fixedly connect to the nut 3 to be incorporated with each other, the another function is to let the locking detents of the nut jacket 5 engage the teeth, i.e. ratchets, of the toothed member 9 directly, so that the unique locking function of the locking drill chuck can be achieved, therefore the locking drill chuck can be used in a reliable operating state.

According to the present invention, the toothed member 9 is fixedly connected to the front portion of the chuck body 1, the locking detents 5-2 engage the teeth of the toothed member 9, the front sleeve 6 is rotatable with respect to the nut jacket 5 within a predetermined circumferential gap, axial grooves that match the elastic positioning pawls 5-1 and elastic locking positioning pawls 5-3 are formed at the inner circumference wall of the small opening end of the front sleeve 6. Through the positioning engagement of the first positioning grooves 6-1 of the front sleeve 6 with the elastic positioning pawls 5-1, in the case of no resistance, the front sleeve 6 carries the nut jacket 5 and further the nut 3 to rotate as the front sleeve 6 is turned, therefore the jaws 4 move forward to reach the drill tool to be fastened, meanwhile the elastic locking positioning pawls 5-3 that is integral with the elastic positioning pawls 5-1 are depressed, the locking detents 5-2 are in the state of non-locking and turned synchronously by the front sleeve 6.

When the jaws 4 come into contact with the surface of the drill tool to be fastened, the input torque applied to the nut 5 increases gradually to fasten the drill tool, in this case, the nut 3 and the nut jacket 5 hold still, hereafter, the front sleeve 6 will turn once the force applied to the front sleeve 6 more than the elastic force of the elastic positioning pawls 5-1 of the nut jacket 5, the elastic positioning pawls 5-1 disengages from the first positioning grooves 6-1 and moves to the second positioning grooves 6-2 of the front sleeve 6, the elastic locking positioning pawls 5-3 moves from the non-locking grooves of the front sleeve 6 to the third grooves 6-3, at the same time, driving keys of the front sleeve 6 move to another clamping side of the key slots of the nut jacket 5, the locking detents 5-2 are released and come into engagement with the teeth of the toothed member 9 in the front portion of the chunk body 1 to form a locking state of the locking drill chuck.

With the increase of the force applied to the front sleeve 6, the nut 3 will turn forward along with the nut jacket 5 when the force reaches to a certain degree, which causes the locking detents 5-2 in the locking state to slide and ticks from one teeth of the toothed member 9 to another teeth, the nut 3 moves until the input torque applied to the front sleeve 6 increase to a certain degree, thereby the locking detents 5-2 are locked in the one way teeth grooves of the toothed member 9. The locking drill chuck can be used with high reliable locking state due to the engagement of the plurality of detents of the nut jacket 5 with the teeth of the toothed member 9.

When loosening, the front sleeve 6 is turned in a reverse direction, the second positioning grooves 6-2 in the inner circumference wall of the front sleeve 6 carry the elastic positioning pawls 5-1, meanwhile the elastic positioning pawls 5-2 at the opposite side of the pawls 5-1 of the nut jacket 5 are in locking state to prevent from loosening. When the torsion applied to the front sleeve 6 in the reverse direction overcomes the elastic force of the elastic positioning pawls 5-1 of the nut jacket 5, the front sleeve 6 turns, which causes the elastic positioning pawls 5-1 disengage from the second positioning grooves 6-2 to another first positioning grooves 6-1, at this time, the elastic locking positioning pawls 5-3 disengage and move from the third positioning grooves 6-3 in a central and upper portion of the front sleeve 6 to a non-locking position, the locking detents 5-2 disengage from the one way ratchets grooves of the toothed member 9 and come into being in a depressed state, at the same time, the driving keys of the front sleeve 6 turn to the other side of the key slots of the nut jacket 5 to loosen, then the locking detents 5-2 are depressed and become disengaged from the ratchets of the toothed member 9 at the front portion of the chuck body 1, so that a loosen state is achieved, with the front sleeve 6 is continuously turned in the reverse direction, the nut 3 rotates when the force applied to the front sleeve 6 increase to a certain degree, which results in the drawing back of the jaws 4, and the drill tools is loosened.

The locking drill chuck according to the present invention has a simple and compact structure, high working stability, convenience of operation, and high reliability of self-locking capability. It can be used for all kinds of drill tools, especially used for impact drill tools.

While the present invention has been described and illustrated herein with reference to the preferred embodiments thereof, it will be apparent to those skilled in the art that various changes and modifications may be made therein without departing from the spirit and scope of the invention. Thus, it is intended that the present invention covers the modifications and variations of this invention that come within the scope of the appended claims and their equivalents.

The invention claimed is:

1. A locking drill chuck comprising
a chuck body having a front portion, a back end and an outer circumference; a plurality of jaws having threads, a nut having threads, a nut jacket having a front end portion, an upper end portion, and an inner circumference wall, a front sleeve having an inner circumference wall, and a rear sleeve, wherein an axial bore engaged with a driving shaft of a driving means is provided at the back end of the chuck body, the rear sleeve is fixedly connected to the outer circumference of the chuck body, the plurality of jaws are respectively installed in angled bores uniformly distributed around the chuck body, the threads of the nut and the threads of the jaws installed in the angled bores of the chuck body are engaged and together form a thread driving mechanism, the nut jacket is fixedly connected to the nut, the locking drill chuck further comprises:
a toothed member fixed to the front portion of the chuck body with respect to the nut, the toothed member having ratchets;
a plurality of elastic elements formed at the front end portion of the nut jacket, each of the elastic elements has an elastic positioning pawl, an elastic locking positioning pawl, and a locking detent thereon;
a plurality of grooves formed in the inner circumference wall of the front sleeve, wherein a positioning state of the elastic elements of the nut jacket can be controlled through the grooves of the front sleeve, and the locking detents and the ratchets of the toothed member engage to form a locking mechanism, and
wherein a plurality of keyslots are formed on the upper end portion of the nut jacket in a radial direction, and the front sleeve has a plurality of keys extending downward to engage with the keyslots and to locate inside the inner circumference wall of the nut jacket respectively.

2. The locking drill chuck as recited in claim 1, wherein the grooves formed in the inner circumference wall of the front sleeve comprise positioning grooves for a loosened state of the front sleeve, positioning grooves for a fastened state of the front sleeve, and locking positioning grooves for locking the front sleeve.

3. The locking drill chuck as recited in claim 1, wherein the ratchets are of angled and formed at a lower portion of an inner circumference wall of the toothed member, the ratchets are engaged with the locking detents of the elastic elements.

4. The locking drill chuck as recited in claim 1, wherein the key slots are formed on the upper end portion of the nut jacket in a radial direction, by wrapping downward.

* * * * *